(12) United States Patent
Deng et al.

(10) Patent No.: US 12,106,599 B2
(45) Date of Patent: Oct. 1, 2024

(54) THIN, MULTI-LENS, OPTICAL FINGERPRINT SENSOR ADAPTED TO IMAGE THROUGH CELL PHONE DISPLAYS AND WITH MULTIPLE PHOTODIODE GROUPS EACH HAVING SEPARATE FIELDS OF VIEW FOR EACH MICROLENS

(71) Applicant: OmniVision Technologies, Inc., Santa Clara, CA (US)

(72) Inventors: Jau-Jan Deng, Taipei (TW); Yi-Wei Liu, New Taipei (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 17/839,000

(22) Filed: Jun. 13, 2022

(65) Prior Publication Data

US 2023/0401889 A1    Dec. 14, 2023

(51) Int. Cl.
    *G06V 40/13*      (2022.01)
    *G06F 3/041*      (2006.01)
    *G06F 3/042*      (2006.01)
    *H04M 1/02*      (2006.01)

(52) U.S. Cl.
CPC ........ *G06V 40/1318* (2022.01); *G06F 3/0412* (2013.01); *G06F 3/042* (2013.01); *H04M 1/0266* (2013.01)

(58) Field of Classification Search
CPC G06V 40/1318; G06V 10/147; G06F 3/0412; G06F 3/042; H04M 1/0266; H04M 1/026; H04M 2250/12

USPC ............................. 250/208.1, 216, 239, 221
See application file for complete search history.

(56) References Cited

U.S. PATENT DOCUMENTS

| | | | |
|---|---|---|---|
| 6,137,535 A | 10/2000 | Meyers | |
| 7,897,903 B2 | 3/2011 | Duparre et al. | |
| 8,629,930 B2 | 1/2014 | Brueckner et al. | |
| 8,717,485 B2 | 5/2014 | Oberdoerster et al. | |
| 9,202,833 B2 | 12/2015 | Mackey | |
| 9,829,614 B2 | 11/2017 | Smith et al. | |
| 10,318,791 B2 * | 6/2019 | He | G06V 40/1306 |

(Continued)

FOREIGN PATENT DOCUMENTS

| | | | | |
|---|---|---|---|---|
| CN | 111095282 A | * | 5/2020 | ........... G02B 3/0056 |
| DE | 102017200618 A1 | * | 7/2018 | ............ G01J 3/0208 |

*Primary Examiner* — Thanh Luu
*Assistant Examiner* — Mai Thi Ngoc Tran
(74) *Attorney, Agent, or Firm* — COZEN O'CONNOR

(57) ABSTRACT

An image sensor for imaging fingerprints has multiple photodiode groups each with field of view through a microlens determined by optical characteristics of the microlens and locations of the microlens and openings of upper and lower mask layers. Many photodiode groups have fields of view outwardly splayed from a center-direct field of view. A diameter of openings of the upper mask layer distant from the group having a center-direct field of view is larger than openings of a photodiode group having a center-direct field of view. A method of matching illumination of a group of photodiodes with center-direct field of view to illumination of photodiode groups having outwardly splayed fields of view includes sizing openings in the upper mask layer of photodiode groups with outwardly splayed fields of view larger than openings in the upper mask layer associated with photodiode groups having center-direct field of view.

19 Claims, 6 Drawing Sheets

(56) References Cited

U.S. PATENT DOCUMENTS

| | | | |
|---|---|---|---|
| 11,281,336 B2* | 3/2022 | Klenkler | G06F 3/0412 |
| 11,328,150 B2 | 5/2022 | Fan | |
| 2001/0026322 A1* | 10/2001 | Takahashi | H01L 27/14627 |
| | | | 348/340 |
| 2002/0135883 A1* | 9/2002 | Nishikawa | G02B 3/0018 |
| | | | 359/619 |
| 2016/0379037 A1* | 12/2016 | Russo | G06V 40/1306 |
| | | | 382/125 |
| 2017/0111558 A1 | 4/2017 | Brueckner et al. | |
| 2019/0179488 A1 | 6/2019 | Klenkler et al. | |
| 2021/0150239 A1* | 5/2021 | Yoon | G06V 40/1312 |
| 2021/0327941 A1* | 10/2021 | Lee | H01L 27/14685 |
| 2021/0351216 A1* | 11/2021 | Hsieh | H01L 27/14623 |

* cited by examiner

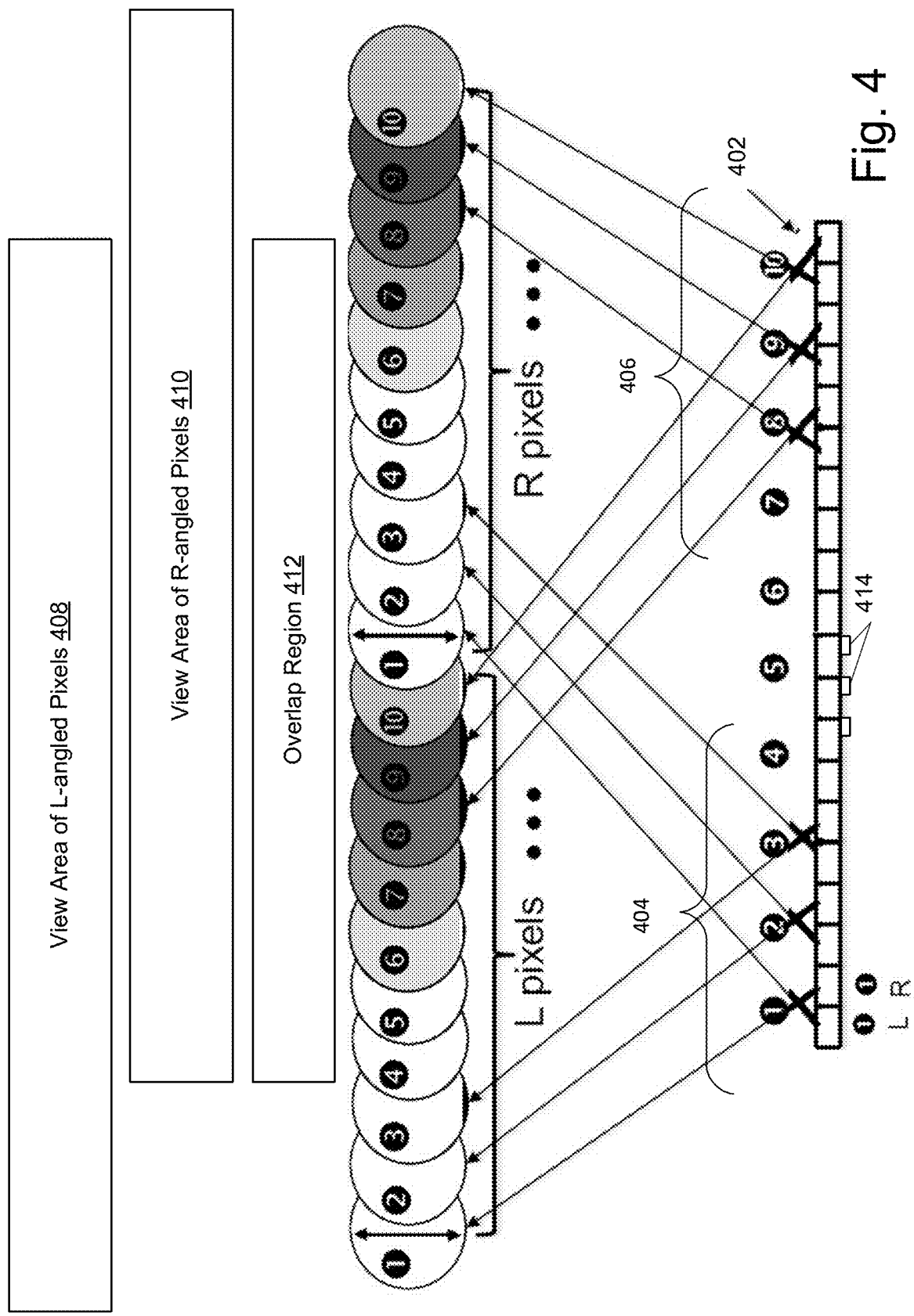

THIN, MULTI-LENS, OPTICAL FINGERPRINT SENSOR ADAPTED TO IMAGE THROUGH CELL PHONE DISPLAYS AND WITH MULTIPLE PHOTODIODE GROUPS EACH HAVING SEPARATE FIELDS OF VIEW FOR EACH MICROLENS

BACKGROUND

Many modern cell phone operating systems, including Apple iOS and Android, are configurable to use biometrics, such as fingerprints, as an alternative to user entry of unlock codes to validate user identity. A prior optical sensor for reading fingerprints used an electronic camera equipped with a single lens and an image sensor with a single array of photosensors to image a fingerprint surface of a finger through an OLED cell-phone display. To image a reasonable area of the finger, the lens and array of photosensors were large and required considerable space between lens and the array of photosensors—posing issues in the limited space available in a cell phone.

As cell phone processing power and display size increase, cell phone power demand rises, yet customers demand long battery life. These two pressures force cell phone designers to include ever-larger batteries. Increasing battery size without increasing phone size requires the battery to extend throughout the back of the phone—encroaching on space formerly occupied by single-lens fingerprint sensor optics.

Cost of fabricating a wafer of integrated circuits, including image sensor integrated circuits, is relatively constant for a given process, while with smaller circuits there are more circuits per wafer. Large circuits also have a higher probability of fabrication defects than smaller circuits. These two effects make large circuits more expensive to make than smaller circuits on the same process.

SUMMARY

An image sensor for imaging fingerprints has multiple photodiode groups each with field of view determined by optical characteristics of a microlens and locations of the microlens and openings of upper and lower mask layers, each field of view through the microlens. Many photodiode groups have fields of view outwardly splayed from a center-direct field of view. A diameter of openings of the upper mask layer distant from the group having a center-direct field of view is larger than openings of a photodiode group having a center-direct field of view.

A method of matching illumination of a group of photodiodes with center-direct field of view to illumination of photodiode groups having outwardly splayed fields of view includes sizing openings in the upper mask layer of photodiode groups with outwardly splayed fields of view larger than openings in the upper mask layer associated with photodiode groups having center-direct field of view.

A system includes a fingerprint sensor, the fingerprint sensor including: a plurality of groups of photodiodes, each group of photodiodes having a field of view determined by locations of a microlens, an opening of an upper mask layer, an opening of a lower mask layer, a pinhole in a metal layer, and the photodiode group in addition to optical characteristics of the microlens, each field of view being through the microlens; where each microlens associated with a plurality of the groups of photodiodes having fields of view outwardly splayed from a center-direct field of view; where a first group of photodiodes of the plurality of groups of photodiodes associated with each microlens has a non-vertical field of view at a first angle relative to a vertical field of view, and a second group of the plurality of photodiodes associated with each microlens has a second angle relative to the vertical field of view, the second angle equal to a negative of the first angle. Also included in the system is a processor coupled to read the groups of photodiodes of the fingerprint sensor; a memory coupled to the processor, the memory having recorded within it a photodiode to fingerprint image map, and a feature library; where the processor is configured to illuminate a fingerprint region of a finger, obtain readings from the groups of photodiodes of the fingerprint sensor and place the readings in fingerprint images according to the fingerprint image map, extract features from the fingerprint images, and compare the extracted features to features in the feature library to identify a user.

BRIEF DESCRIPTION OF THE FIGURES

FIG. 4 illustrates views from left-angle-viewing and right-angle-viewing photodiode groups.

DETAILED DESCRIPTION OF THE EMBODIMENTS

In order to provide a fingerprint sensor thin enough to fit between an organic light emitting diode (OLED) screen and a battery of a cell phone, we use a sensor resembling the compound insect eye with many microlenses each focusing light on one, or a small group of, associated photodiodes. Each microlens is provided with multiple collimators, each providing light to separate groups of one or more photodiodes. Further, in order to help minimize area of the fingerprint sensor, we splay outwards view angles of collimators; by doing so the sensor can be smaller than the area of fingerprint it is configured to photograph while providing high resolution from overlapping fields of view in central region of the fingerprint.

In typical fingerprints, ridges have lower reflectance than the valleys between ridges. The fingerprint sensor photographs these ridges and valleys so a processor can compare patterns in the ridges and valleys to a database of one or more master patterns.

Figure 1:
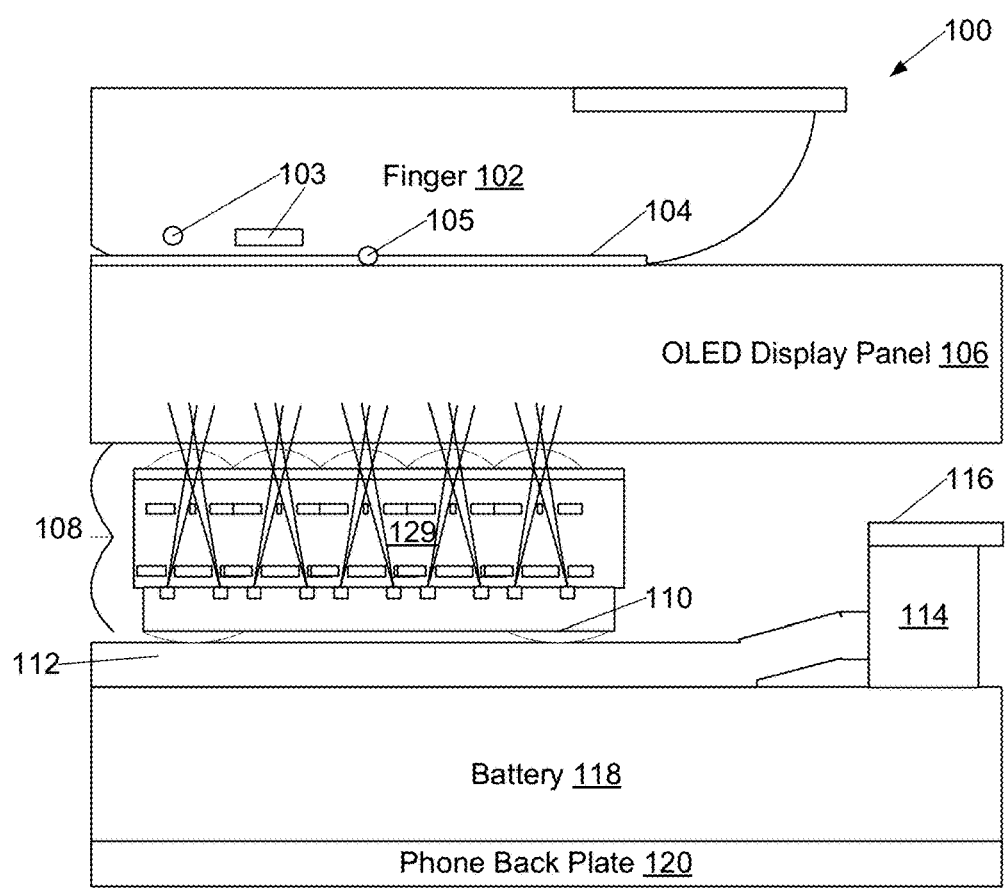
FIG. 1 is a cross sectional schematic diagram of a finger, OLED display, an optical fingerprint sensor module having a microlens array, masks bearing openings or pinholes, spacer, and image sensor, and a flexible circuit board.

In an example 100 (FIG. 1), with height of cell phone components greatly exaggerated, a finger 102 is positioned with its fingerprint region 104 over an OLED screen 106. Beneath the OLED screen 106 lies fingerprint sensor 108, which is ball-bonded 110 to a flexible circuit board 112. Circuit board 112 may couple through connectors 114 to other circuit boards 116 of the cell phone. Beneath circuit board 112 lies a battery 118 and a back plate 120 of the phone.

Figure 2:
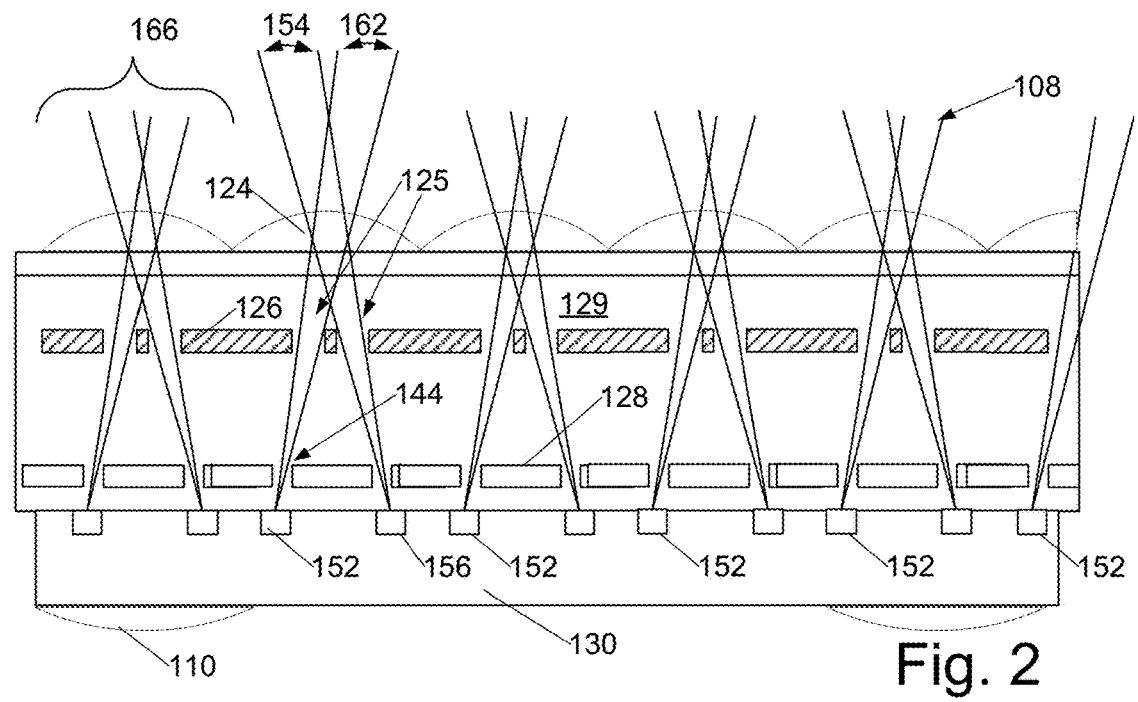
FIG. 2 is a cross sectional schematic diagram of the fingerprint sensor module of FIG. 1 illustrating multiple photosensor groups with fields of view ranging from a central direct angle to a maximum splayed outward angle.

The fingerprint sensor 108 (FIG. 1 and enlarged in FIG. 2) has an array of microlenses where each microlens 124 is aligned with two, four, or more openings 125, in an upper mask layer 126 and an opening in a lower mask layer 128, the masks with openings are embedded in a transparent spacer 129. Typically, upper mask layer 126 and lower mask layer 128 are black masks of light-absorbing material. The microlenses 124 and openings 125 in upper mask layer 126 and lower mask layer 128 are aligned with photodiode groups 152, 156, each group having one or more photodiodes, formed in semiconductor 130.

The openings 125, in upper mask layer 126 and openings 144, in lower mask layer 128 and associated with each microlens 124 form a viewing group 166 and are aligned such that a first photodiode group 156 associated with microlens 124 has a left angled field of view 154, and a second photodiode group 152 has a right-angled field of view 162. Each photodiode group has one or more photodiodes. For purposes of this document, angled fields of view such as left field of view 154 and right field of view 162 that are not aimed directly at a nearest point of fingerprint region 104 are outward-angled fields of view for that microlens. Each field of view is determined by alignment of locations of the photodiode groups 152, 156, and the openings of both the upper and lower mask layers, the microlens and optical characteristics of the microlens, and is through the microlens 124 of the array of microlenses.

In embodiments, a metal layer having pinoles is disposed between lower mask layer 128 and the photodiode groups, the pinholes in this mask layer are aligned with openings 125 and 144 in the upper and lower mask layers.

In embodiments, left-angled field of view 154 has a first angle from vertical, and right-angled field of view 162 has a second angle, where the first angle is a negative of the second angle, in each viewing group 166. The left-angled field of view 154 and right-angled field of view 162 are both non-vertical.

Figure 3:
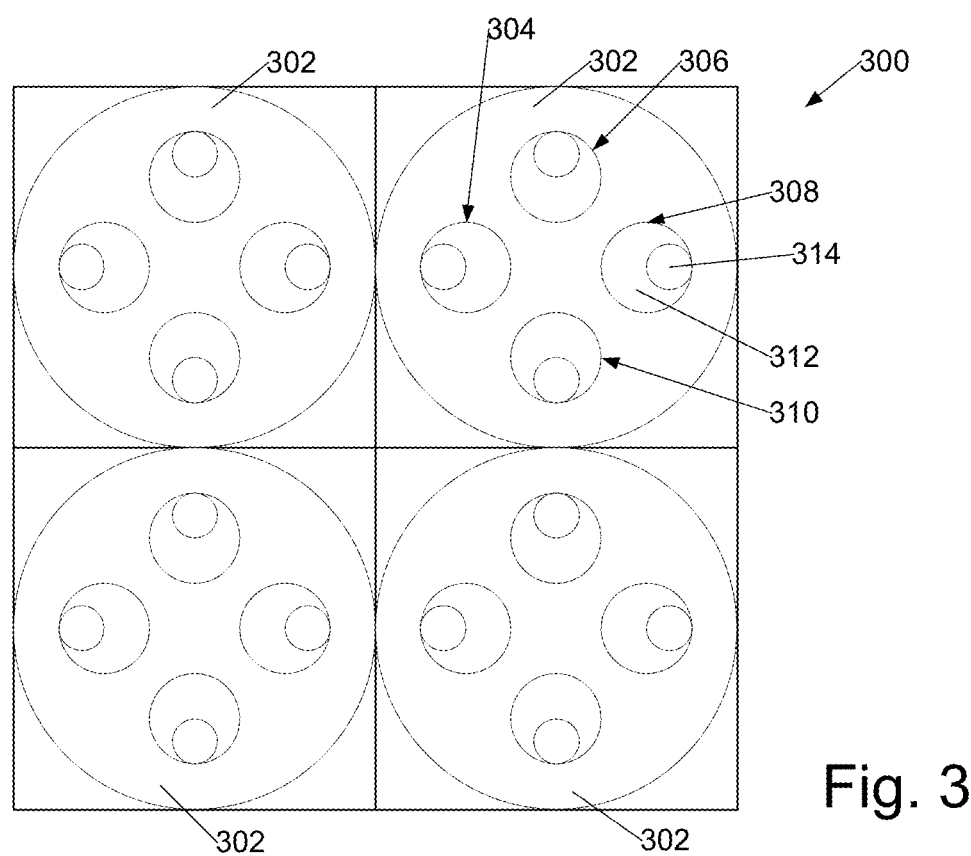
FIG. 3 is a top plan view of four adjacent microlenses illustrating four photodiode groups and associated mask layer openings and pinholes associated with each microlens in a fingerprint sensor.

A portion of a microlens and opening and pinhole array 300 is illustrated in FIG. 3. Illustrated are four adjacent microlenses 302, each with four opening pairs 304, 306, 308, 310 (the larger opening 312 of each pair is in the upper mask layer, the lower opening is in the lower mask layer), and each pair is associated with a photodiode group of one or more photodiodes (not shown in FIG. 3).

Figure 3A:
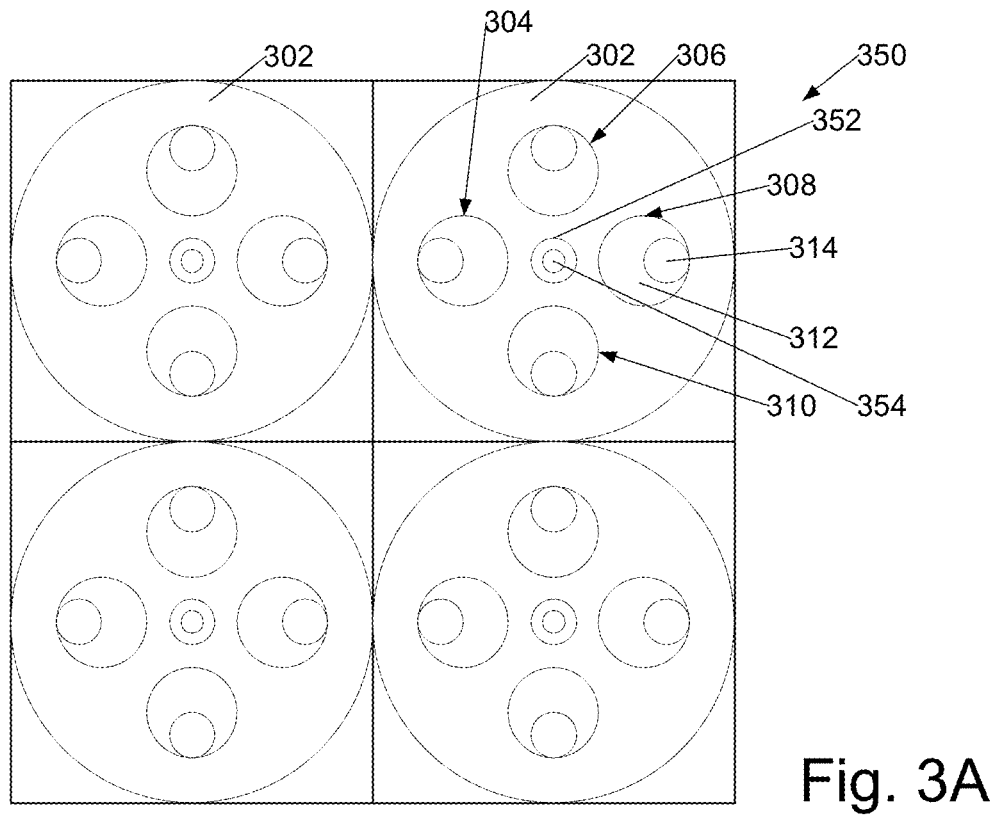
FIG. 3A is a top plan view of an embodiment like that of FIG. 3 but with an additional central, narrow field-of-view, photodiode group and associated openings and pinhole provided for anti-spoofing purposes.

A portion of an alternative microlens, opening, and pinhole array 350 (FIG. 3A) illustrated in top plan view is like that of FIG. 3 but with an optional, additional central, narrow field-of-view, photodiode group and associated small-diameter openings 352, 354 provided under some or all microlenses, the additional photodiode group having different color sensitivity than photodiode groups associated with opening pairs 304, 306, 308, 310 and used for fingerprint spoofing countermeasures such as verification of finger color in visible and infrared light.

Figure 3B:
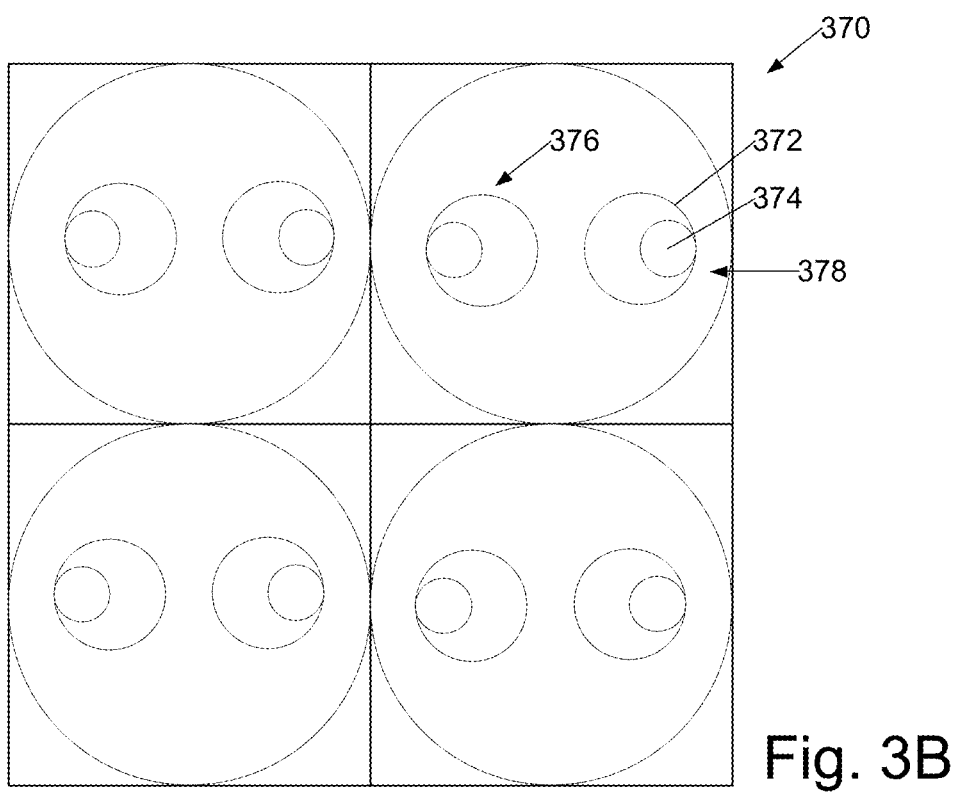
FIG. 3B is a top plan view of an embodiment having two pairs of openings in upper and lower mask layers associated with each microlens instead of four.

A portion of another alternative microlens, opening, and pinhole array 370 (FIG. 3B) illustrated in top plan view has two pairs of openings in upper 372 and lower 374 mask layers instead of four pairs as illustrated in FIG. 3, each pair being associated with a photodiode group. In a version of the embodiment of FIG. 3B, some photodiode groups, such as the photodiode group associated with opening pair 376 and where fields of view overlap fields of view of other photodiode groups, have filters to provide a different color response than other photodiode groups 378 and are used for fingerprint spoofing countermeasures such as verification of finger color in visible and infrared light.

In actual embodiments, there are thousands of microlenses 302, opening pairs 304, 306, 308, 310 and photodiode groups 152, 156 in the array to provide adequate resolution to recognize fingerprints of particular individuals. View angles of a central ray of photodiode groups through aligned openings in embodiments may range from ten, to twelve through seventeen to less than or equal to twenty degrees from a vertical, direct, view of fingerprint region 104. This permits the fingerprint sensor 108 to be significantly smaller than the entire scanned fingerprint region 104. Each multiple-opening collimator may have a fairly narrow field of view, in some embodiments only three degrees or less. In embodiments, microlens pitch may range from twenty to twenty-five micrometers.

The upper row of overlapping circles (labeled 1, 2, 3, 4, 5, 6, 7, 8, 9, and 10) in FIG. 4 represent fields of view at the fingerprint of individual photodiode groups (not shown in FIG. 4 but shown as 152, 156 in FIG. 1 and other figures) through corresponding microlenses 402 shown under them and having corresponding labels 1,2, 3, 4, 5, 6, 7, 8, 9, and 10, as indicated by the arrows.

The overlap region 412 may be utilized to provide higher resolution fingerprint images of that portion of fingerprint region 104 lying within overlap region 412. In alternative embodiments, some of the photodiode groups that would otherwise overlap are equipped with color filters 414 of one, three, or more color passband characteristics to permit full-color or hyperspectral color verification that the fingerprint region 104 matches infrared, color or hyperspectral color characteristics of a human fingerprint going beyond color resolution obtainable by altering colors provided to the fingerprint regions 104 by OLED screen 106. In a particular embodiment, color filters 414 include infrared-passing, visible-light blocking filters of two wavelengths, red-passing, green-passing, and blue-passing filters that permit determining if fingerprint region 104 displays red and infrared spectral characteristics associated with oxygenated hemoglobin as well as full-color verification; by observing oxygenation of hemoglobin for a few seconds it may be possible to verify presence of a pulse in finger 102. While monochrome fingerprint images suffice for identifying fingerprint patterns, this red and infrared, full-color or hyperspectral-color verification may serve as an anti-spoofing method in an anti-spoofing routine by identifying some faked fingerprint regions associated with copies or fake fingers. In addition to identifying color of the fingerprint region 104, in some embodiments sufficient color resolution is provided to image a pattern of blood vessels 103 within finger 102. In other embodiments, sufficient resolution is provided to identify some sweat-gland pores in fingerprint region 104 and mapping these relative to the obtained fingerprint images; again, these pores are often lacking in fake fingers and this mapping of sweat-gland pores to fingerprint images serves as an anti-spoofing method for an anti-spoofing routine.

Figure 5:
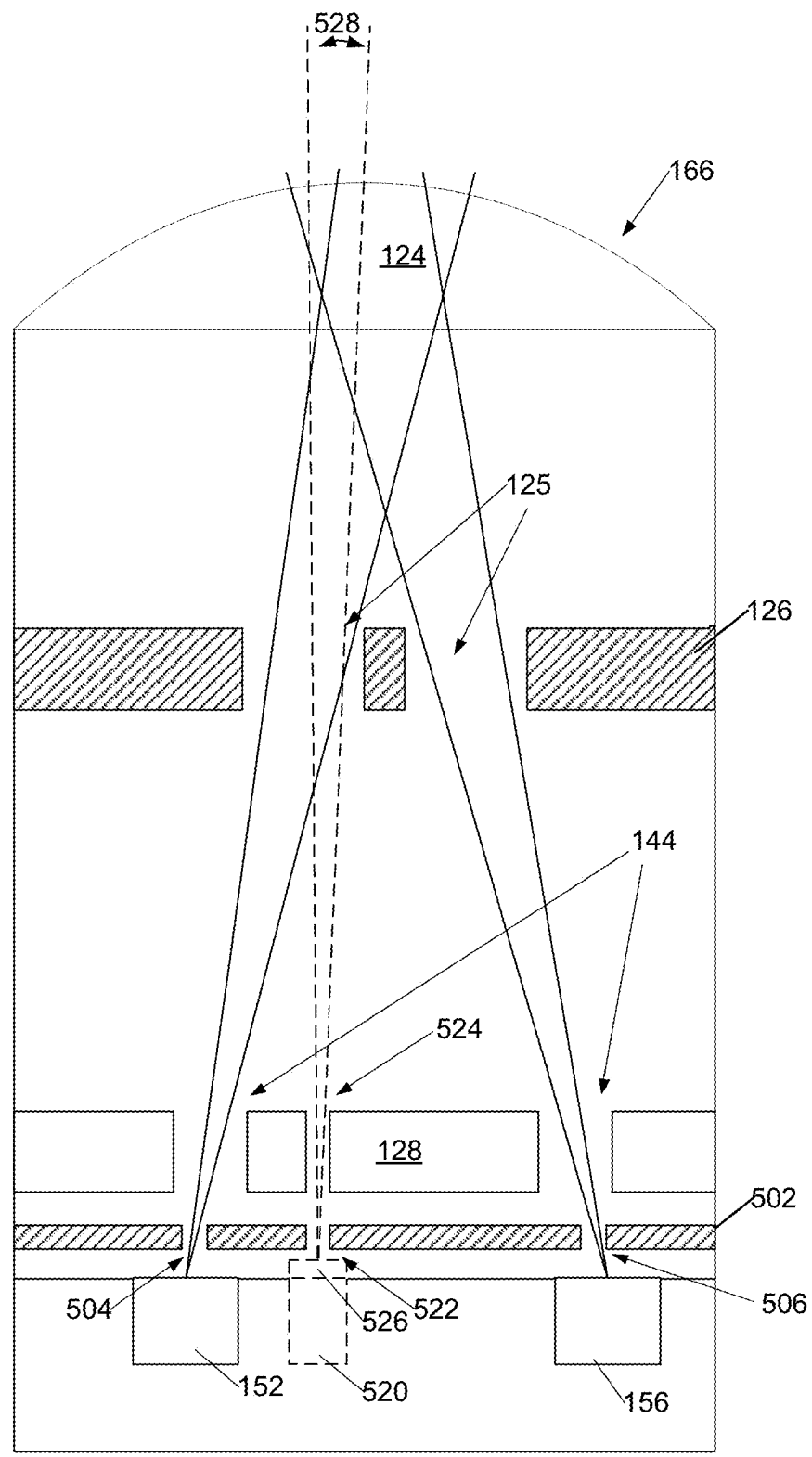
FIG. 5 is an expanded diagram illustrating openings of a lower mask layer and pinholes in a metal layer for each opening of the upper layer, each pinhole in the metal layer and opening of the lower mask layer being associated with a photodiode group.

In embodiments, within each viewing group 166 and below openings 144 in lower mask layer 128 is a metal layer 502 (FIG. 5). In metal layer 502 are pinholes 504, 506. These pinholes 504, 506, in lower mask layer 128 are aligned with openings 144 and help narrow a width of the field of view of each photodiode group. It should be noted that metal layer 502 and pinholes 504, 506 are present in the embodiments of FIGS. 1, 2, and 3 but are omitted for clarity. In a particular embodiment, pinholes 504, 506 have diameter of four micrometers, openings 144 in lower mask layer 128 have diameter from 14 to 17 micrometers, and openings 125 in upper mask layer 126 have diameter from 15 to 18 micrometers.

In alternative embodiments, additional optional photodiode groups 520 provided for anti-spoofing purposes and aimed directly at fingerprint region 104 have optional pinholes 522 in metal layer 502 of diameters about two microns and view the fingerprint region directly with a narrow field of view 528 through a small, vertically-aligned, opening 524 in lower mask layer 128; these optional additional photodiode groups 520 may be associated with an optional color filter 526 and may view fingerprint region 104 either through a dedicated hole in upper mask layer 126 or may share an opening 125 in upper mask layer 126 with another photodiode group, such as photodiode group 152 (shown) or 156.

Figure 7:
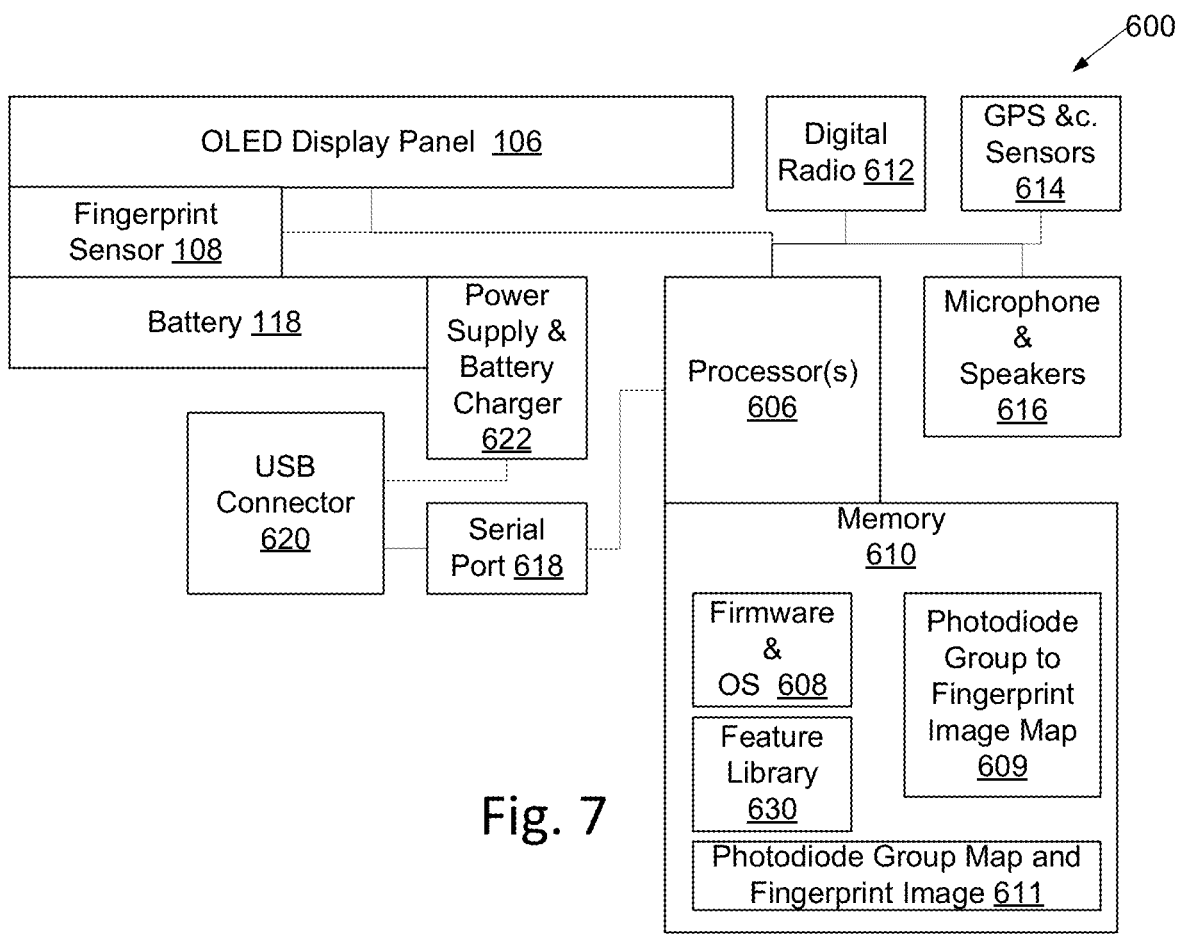
FIG. 7 is a block diagram illustrating a cellular telephone device in which the optical fingerprint sensor may be used.

The fingerprint sensor 108 is used in a cellular telephone 600 (FIG. 7); the smart cellular telephone 600, or other electronic device such as a tablet computer, fast-access gun safe, entry control system, or tablet computer incorporates OLED screen 106, typically having touch sensing capability, operable under control by one or more processors 606 coupled to receive raw images or extracted features from fingerprint sensor 108. One or more processors 606 operate under control of firmware and an operating system 608 in a memory system 610 and are also coupled to one or more digital radios 612 configured for two-way communications with at least digital cellular towers. The processors 606 are also coupled to a global positioning system receiver and other sensors 614 such as accelerometers, a microphone and speaker 616, and in many embodiments a serial port 618 coupled to a universal serial bus (USB) interface 620. Cellular telephone 600 is powered by the battery 118, through a power supply circuit and recharged by a charger 622.

In embodiments where both left views 408 and right views 410 angled photodiodes or pixels of the fingerprint sensor are to be used in overlap region 412 to provide high resolution fingerprint images, memory system 610 contains a space for a temporary fingerprint image 611 and a photodiode group to fingerprint image map 609 specific to a cellular telephone 600 model and OLED screen 106 thickness that contains a mapping of right viewing photodiode groups 152 and left viewing photodiode groups 156 to pixels of the temporary fingerprint image.

Figure 6:
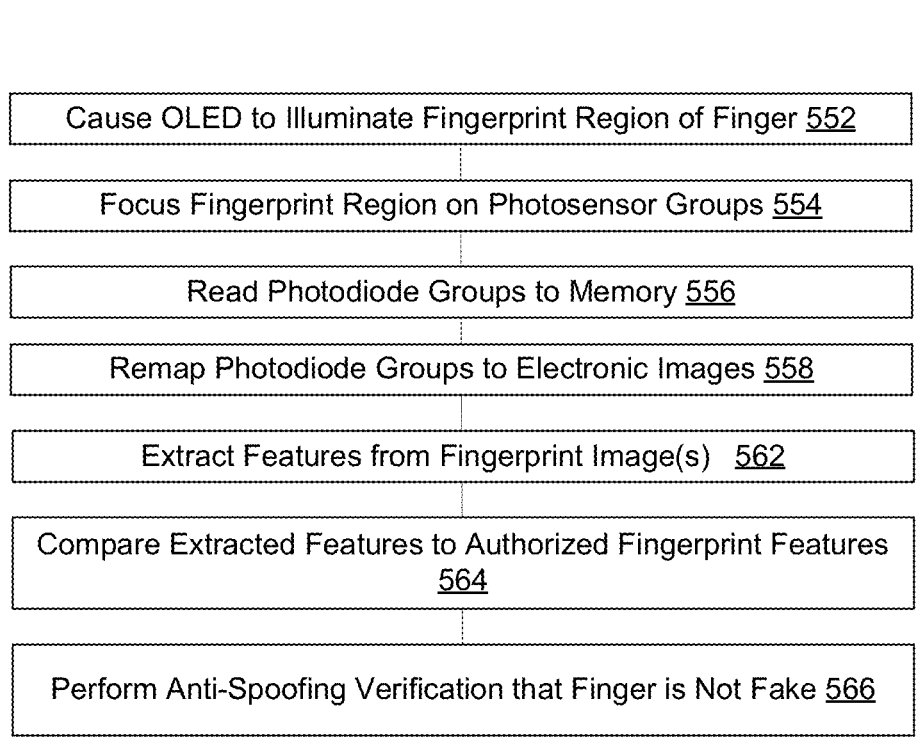
FIG. 6 is flowchart illustrating operation of the fingerprint sensor.

The fingerprint sensor is operated by a method 550 (FIG. 6) operable on processor 606 (FIG. 7) under control of the firmware and operating system 608 that includes illuminating 552 the fingerprint region 104 (FIG. 2) of the finger 102 using the OLED screen 106; light from the fingerprint region 104 is focused 554 by microlenses 124 onto associated photodiode groups 152, 156 of the fingerprint sensor. The photosensor groups 132 are then read 556 and remapped 558 and recorded to form electronic fingerprint images in temporary fingerprint image 611 as remapped by photodiode group to fingerprint image map 609. Features are then extracted 562 from the electronic fingerprint images or from the overlapping electronic fingerprint images; these features are then compared 564 to features associated with one or more users in a feature library 630 of features comprising features associated with one or more fingers of one or more authorized users in memory system 610. A successful comparison verifies identity of a user to whom finger 102 belongs, and an unsuccessful comparison may deny access.

To verify that finger 102 is a real finger, additional anti-spoofing methods 566 are executed by anti-spoofing routines that may include one or more of recognition of sweat pore locations of finger 102 and comparison with known sweat pore locations in feature library 630, color or hypercolor imaging of finger 102 to verify finger 102 has color resembling that of a human finger, infrared or optical imaging of blood vessels in finger 102, or extraction of oxygen saturation from two-color imaging of finger 102 to detect a pulse that is typically absent in fake fingers.

In alternative embodiments such as a gun safe or building access control lock, illumination may be provided by devices other than an OLED panel such as light emitting diodes or lamps.

Combinations of Features

The concepts and features herein described can be combined in a variety of ways, some of which anticipated by the inventors include:

A fingerprint sensor designated A, including multiple microlenses; for each microlens, multiple groups of one or more photodiodes associated with the microlens, each group of photodiodes, having a field of view determined by locations of an opening of an upper mask layer, an opening of a lower mask layer, and the photodiode group, and the microlens in addition to optical characteristics of the microlens, each field of view being through the microlens. The groups of photodiodes have non-vertical fields of view at a plurality of angles differing from vertical, and a first group of photodiodes of the plurality of groups of photodiodes has a non-vertical field of view at a first angle relative to a vertical field of view, and a second group of the plurality of groups of photodiodes has a second angle relative to the vertical field of view, the second angle equal to a negative of the first angle.

A fingerprint sensor designated AA including the fingerprint sensor designated A, wherein a first plurality of the microlenses are associated with first groups of photodiodes having fields of view overlapping fields of view of second groups of photodiodes associated with a second plurality of the microlenses, the first plurality of the microlenses being different from the second plurality of the microlenses.

A fingerprint sensor designated AB including the fingerprint sensor designated A or AA, wherein the non-vertical fields of view include fields of view differing from vertical by at least 10 degrees.

A fingerprint sensor designated AC including the fingerprint sensor designated AB, wherein the non-vertical fields of view include fields of view differing from vertical by at least 12 degrees.

A fingerprint sensor designated AD including the fingerprint sensor designated AC wherein the non-vertical fields of view include fields of view differing from vertical by at least 17 degrees.

A fingerprint sensor designated AE including the fingerprint sensor designated A, AA, AB, AC, or AD, wherein non-vertical fields of view include fields of view differing from vertical by less than or equal to twenty degrees.

A fingerprint sensor designated AF including the fingerprint sensor designated A, AA, AB, AC, AD or AE further including a plurality of photodiode groups having a vertical field of view through microlenses of the plurality of microlenses.

A system designated B including the fingerprint sensor designated A, AA, AB, AC, AD, AE, or AF, a memory, and a processor, wherein the memory comprises code configured to obtain readings of the first and second groups of photodiodes associated with first and second pluralities of microlenses and use the readings and a photodiode to fingerprint image map to construct a fingerprint image.

A fingerprint sensor designated AG including the fingerprint sensor designated A, AA, AB, AC, AD, AE, or AF where each group of photodiodes includes a single photodiode.

A fingerprint sensor designated AH including the fingerprint sensor designated A, AA, AB, AC, AD, AE, or AF where each group of photodiodes includes multiple photodiodes.

A fingerprint sensor designated AJ including the fingerprint sensor designated AF wherein the additional photodiode groups having a vertical field of view are associated with filters.

A fingerprint sensor designated AK including the fingerprint sensor designated A, AA, AB, AC, AD, AE, AF, AG, AH, or AJ wherein, for each of the plurality of photodiode groups associated with each microlens of the plurality of microlenses, the field of view is further defined by a pinhole in a metal layer.

A system designated C incorporating a fingerprint sensor, the fingerprint sensor including: a plurality of groups of photodiodes, each group of photodiodes having a field of view determined by locations of a microlens, an opening of an upper mask layer, an opening of a lower mask layer, a pinhole in a metal layer, and the photodiode group in addition to optical characteristics of the microlens, each field of view being through the microlens; where each microlens associated with a plurality of the groups of photodiodes having fields of view outwardly splayed from a center-direct field of view; where a first group of photodiodes of the plurality of groups of photodiodes associated with each microlens has a non-vertical field of view at a first angle relative to a vertical field of view, and a second group of the plurality of photodiodes associated with each microlens has a second angle relative to the vertical field of view, the second angle equal to a negative of the first angle.

A system designated CA including the system designated C further including a processor coupled to read the groups of photodiodes of the fingerprint sensor; a memory coupled to the processor, the memory having recorded within it a photodiode to fingerprint image map, and a feature library; where the processor is configured to illuminate a fingerprint region of a finger, obtain readings from the groups of photodiodes of the fingerprint sensor and place the readings in fingerprint images according to the fingerprint image map, extract features from the fingerprint images, and compare the extracted features to features in the feature library to identify a user.

A system designated CA including the system designated C further comprising anti-spoofing routines in the memory.

A system designated CB including the system designated C or CA embedded in a cellular telephone.

A system designated CC including the system designated C or CA embedded in a safe or access control lock.

A system designated CD including the system designated C, CA, CB, or CC wherein the anti-spoofing routines verify color of the fingerprint region of the finger.

A system designated CE including the system designated C, CA, CB, CC or CD wherein the anti-spoofing routines identify sweat-gland pores in the fingerprint region of the finger.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A fingerprint sensor, comprising:
   a plurality of microlenses;
   for each microlens of the plurality of microlenses, a plurality of groups of photodiodes associated with the microlens, each group of photodiodes comprising at least one photodiode, having a field of view determined by optical characteristics of the microlens and locations of an opening of an upper mask layer, an opening of a lower mask layer, and the photodiode group, and the microlens each field of view being through the microlens, where a plurality of the groups of photodiodes are angled groups of photodiodes have non-vertical fields of view at a plurality of angles differing from vertical, and where a first group of the angled groups of photodiodes of the plurality of groups of photodiodes has a non-vertical field of view at a first angle relative to a vertical field of view, and a second group of the plurality of groups of angled groups of photodiodes has a second angle relative to the vertical field of view, the second angle equal to a negative of the first angle;
   wherein the upper mask and the lower mask are embedded in a transparent spacer, and
   wherein a metal layer having angled pinholes is disposed between the lower mask layer and the groups of photodiodes, the angled pinholes in the metal layer being aligned with the openings of the upper and lower mask layers and angled groups of photodiodes selected from the first and second groups of angled photodiodes; and
   further comprising a plurality of vertical photodiode groups having a vertical field of view through microlenses of the plurality of microlenses;
   the photodiode groups having a vertical field of view associated with vertical pinholes in the metal layer, the vertical pinholes separate from the angled pinholes.

2. A system comprising the fingerprint sensor of claim 1, a memory, and a processor, wherein the memory comprises code configured to obtain readings of the first and second groups of photodiodes associated with first and second pluralities of microlenses and use the readings and a photodiode to fingerprint image map to construct a fingerprint image.

3. The fingerprint sensor of claim 1 wherein the vertical pinholes are smaller than the angled pinholes.

4. the fingerprint sensor of claim 3 wherein the vertical pinholes are associated with vertical filters, the vertical filters being different from any filters associated with the angled pinholes.

5. The fingerprint sensor of claim 4, wherein a first plurality of the microlenses are associated with a first plurality of groups of photodiodes having fields of view overlapping fields of view of a second plurality of groups of photodiodes associated with a second plurality of the microlenses, the first plurality of the microlenses being different from the second plurality of the microlenses.

6. The fingerprint sensor of claim 5, wherein the non-vertical fields of view include fields of view differing from vertical by at least 10 degrees.

7. The fingerprint sensor of claim 6, wherein the non-vertical fields of view include fields of view differing from vertical by at least 12 degrees.

8. The fingerprint sensor of claim 7, wherein the non-vertical fields of view include fields of view differing from vertical by at least 17 degrees.

9. The fingerprint sensor of claim 8, wherein non-vertical fields of view include fields of view differing from vertical by less than or equal to twenty degrees.

10. The fingerprint sensor of claim 5, where each group of photodiodes includes a single photodiode.

11. The fingerprint sensor of claim 5, where each group of photodiodes includes a plurality of photodiodes.

12. The fingerprint sensor of claim 5 wherein, for each of the plurality of photodiode groups associated with each microlens of the plurality of microlenses, the field of view is further defined by the pinhole in the metal layer.

13. A fingerprint sensor, comprising:
a plurality of microlenses;
for each microlens of the plurality of microlenses, a plurality of groups of angled photodiodes associated with the microlens, each group of angled photodiodes comprising at least one photodiode, having a field of view determined by optical characteristics of the microlens and locations of an opening of an upper mask layer, an opening of a lower mask layer, and the angled photodiode group, and the microlens each field of view being through the microlens, where the groups of angled photodiodes have non-vertical fields of view at a plurality of angles differing from vertical, and where a first group of angled photodiodes of the plurality of groups of photodiodes has a non-vertical field of view at a first angle relative to a vertical field of view, and a second group of the plurality of groups of angled photodiodes has a second angle relative to the vertical field of view, the second angle equal to a negative of the first angle;
wherein the upper mask and the lower mask are embedded in a transparent spacer, and
wherein a metal layer having angled pinholes is disposed between the lower mask layer and the angled photodiodes groups, the angled pinholes in the metal layer being aligned with the openings of the upper and lower mask layers and the angled photodiode groups;
wherein a plurality of the microlenses are associated with a vertical photodiode group having a vertical field of view;
wherein the photodiode group having the vertical field of view is associated with filters and is associated with a vertical pinhole in the metal layer smaller than the angled pinholes, the filters causing the photodiode group having the vertical field of view to have different color sensitivity than the plurality of groups of angled photodiodes associated with the microlens.

14. A system comprising the fingerprint sensor of claim 13 further comprising:
a processor coupled to read the groups of photodiodes of the fingerprint sensor;
a memory coupled to the processor, the memory having recorded within it a photodiode to fingerprint image map, and a feature library; where
the processor is configured to illuminate a fingerprint region of a finger, obtain readings from the groups of photodiodes of the fingerprint sensor and place the readings in fingerprint images according to the fingerprint image map, extract features from the fingerprint images, and compare the extracted features to features in the feature library to identify a user.

15. The system of claim 14 further comprising anti-spoofing routines in the memory.

16. The system of claim 15 embedded in a cellular telephone.

17. The system of claim 15 embedded in a safe or access control lock.

18. The system of claim 15 wherein the anti-spoofing routines verify color of the fingerprint region of the finger.

19. The system of claim 15 wherein the anti-spoofing routines identify sweat-gland pores in the fingerprint region of the finger.

* * * * *